Feb. 8, 1972  A. COOPER  3,640,915
PRODUCTION OF FOAMED POLYETHYLENE
Filed Oct. 17, 1968
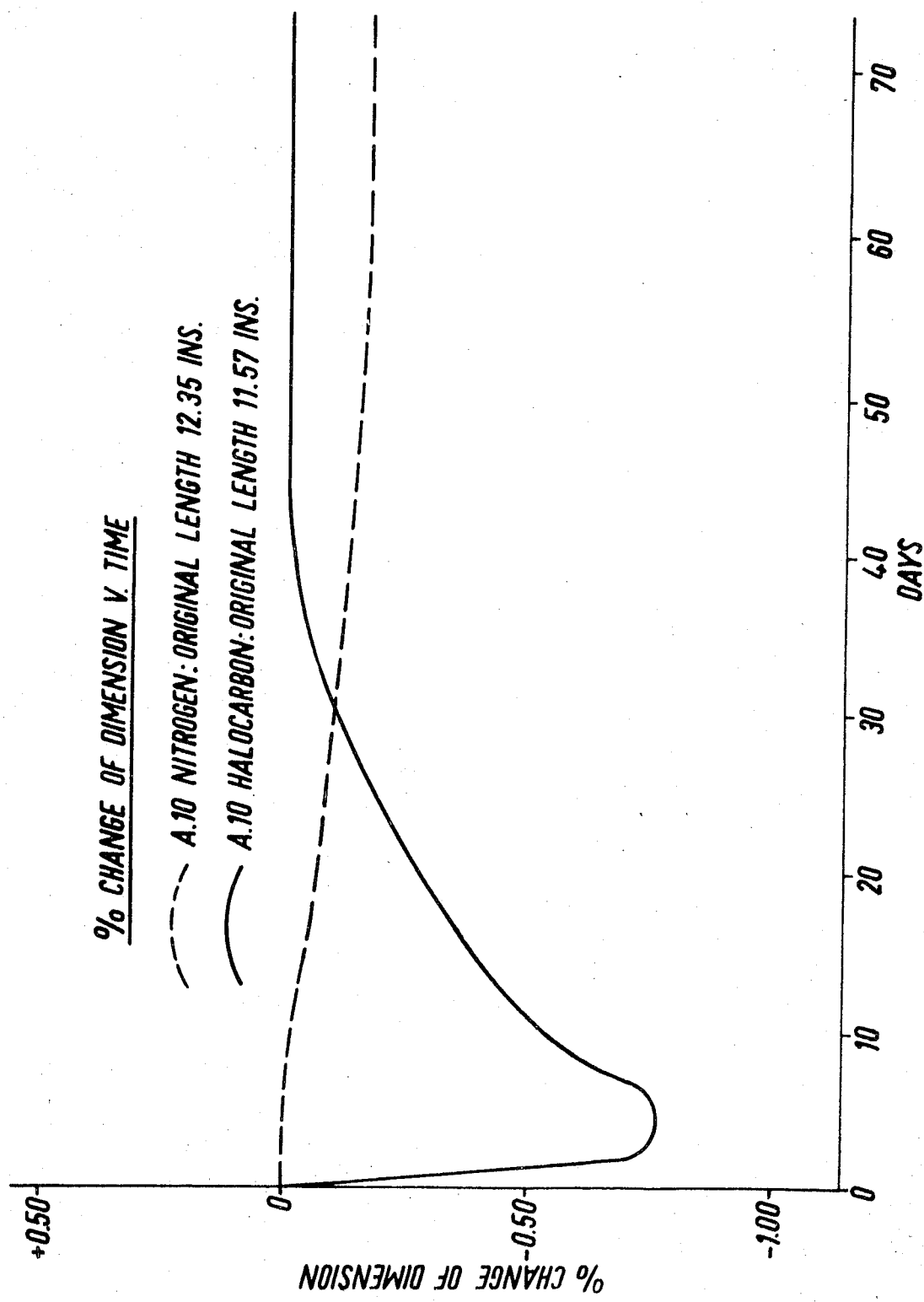
INVENTOR
ALFRED COOPER
BY Stevens, Davis, Miller & Mosher
ATTORNEYS

United States Patent Office 3,640,915
Patented Feb. 8, 1972

3,640,915
PRODUCTION OF FOAMED POLYETHYLENE
Alfred Cooper, Sanderstead, England, assignor to Expanded Rubber & Plastics Ltd., Croydon, England
Continuation-in-part of application Ser. No. 476,679, Aug. 2, 1965. This application Oct. 17, 1968, Ser. No. 768,521
Int. Cl. C08f 27/00, 29/04, 47/10
U.S. Cl. 260—2.5 R                 10 Claims

ABSTRACT OF THE DISCLOSURE

The present invention relates to a process for producing expanded polyethylene having a density of from 1 to 5 lbs./ft.$^3$ comprising raising the melting point of ethylene polymer by subjecting the polymer to a cross-linking treatment equivalent to that produced by an irradiation dose of between 2 and 6 megarads and thereafter heating the cross-linked polymer to a temperature above the softening temperature in atmosphere of nitrogen at a pressure of 2,000 to 12,000 lbs. per square inch to impregnate the polymer with nitrogen and expanding the nitrogen-impregnated polymer by releasing the pressure thereon.

---

This invention relates to improvements in the production of lightweight cellular polyethylene having a non-intercommunicating cellular structure. This application is a continuation-in-part of our co-pending application No. 476,679, now abandoned.

The method of producing expanded polyethylene by submitting the molten polymer to a gas at high temperature in a pressure vessel is well known. In particular, this aspect has been developed in the cable industry where cables are covered with expanded polyethylene having certain advantages and may be prepared using an extruder as the pressure vessel. As the cable and the polyethylene containing dissolved gas emerge from the high pressure zone in the extruder, the polyethylene expands about the cable to form a foamed or expanded sheath.

Various gases such as carbon dioxide, nitrogen, methane, butane, methyl chloride have been used but hitherto it has been difficult to achieve densities of less than 20 lbs. per cubic ft. When a gas is used, such as nitrogen which is not easily soluble in the polymer the density may be as high as 30 lbs. per sq. ft.

Recent attempts to produce lightweight foamed polyethylene having a low density, have proposed the use of various types of blowing agents which are normally gaseous but which can be liquified under pressure. Typical of these normal gaseous blowing agents are the chlorinated hydrocarbons.

The use of these halogenated gaseous foaming agents has tended to result in a foamed product which experiences a change in shape and dimensions with the passage of time and it has been noted that the change of shape and dimension proceeds through a particular cycle. This phenomenon has been noticed to be present in one form or another in all forms of low density expanded rubber or plastics material when a gaseous halogenated hydrocarbon or the like is employed as the expanding or foaming agent, the physical effects of the particular phenomenon being different depending upon the nature of the foam itself.

It is believed that the physical instability of low density foamed materials in general, which results in the dimensional instability of a resilient foam material in particular arises from the difference in the rate of diffusion of the gaseous foaming agent from the individual cells in the foamed material and the rate of diffusion of the gaseous contents of the surroundings or atmosphere into said cells. Thus, where the gaseous foaming agent will diffuse out of the material or out of the individual cells of the materials faster than the gases of the surroundings will diffuse in, the number of gas molecules in each cell will decrease with the passage of time. In a rigid dense material this is not particularly objectionable, but in a flexible lightweight or low density material it results in a contraction of the individual cells and thus results in an overall contraction in the size of the article formed.

Conversely if the rate of diffusion of the gases in the surroundings into the individual cells of the resilient foamed material is greater than the rate of diffusion of the gaseous foaming agent or agents out of those individual cells, then the number of gas molecules within the cell will increase. We have found that in some materials the pressure increases because of the increase in the number of gas molecules in the cell can be as much as twice that of atmospheric pressure. As stated above in a rigid foamed material, the dimensions would not alter appreciably, but in a lightweight resilient foam material the effect is to increase the size of the individual cells in the foam thereby resulting in an overall increase in the size of an article formed therefrom.

It has been proposed hitherto to raise the melting point of polyethylene by a cross-linking treatment involving:

(a) ionizing radiation or
(b) heating in the presence of an organic peroxide to a temperature at which the organic peroxide dissociates into free radicals.

It has now been found that the above treatment not only raises the melting point but also produces other changes which render the material capable of expansion to a foamed material having a density within the range 1 to 5 lbs. per cubic ft. provided that the duration of the ionizing radiation or treating in the presence of an organic peroxide are adjusted within the limits hereinafter specified so that the cells formed in the expanding treatment will be strong enough to retain the gas and to maintain the expanded structure.

Materials, such as foamed polyethylene, are particularly useful for sealing strips and gaskets. In this application, it is necessary that the strip or gasket should have exact tolerances for ease of assembly since if the strip or gasket is slightly oversized or slightly undersized it is necessary to "fiddle" the gasket into its desired position to effect a seal. If a large number of gaskets are not the precise size, the need to "fiddle" each gasket can cause some considerable delay on an assembly line.

The prior proposals for the production of lightweight foamed polyethylene have required that the blowing agent be incorporated within the material prior to cross-linking.

In the present process, it is not necessary to add the blowing agent prior to cross-linking and this avoids any possibility of premature expansion prior to cross-linking.

It is an object of the present invention to provide a lightweight expanded polyethylene having a substantial dimensional stability.

It is a further object of the present invention to provide an expanded polyethylene having a density within the range 1 to 5 lbs. per cubic ft.

It is a further object of the present invention to provide a process for the production of foamed lightweight polyethylene in which the blowing agent is incorporated after cross-linking thereby permitting cross-linking of the material at one location and incorporation of gaseous blowing agent and expansion to be effected subsequently at another location.

The above objects and further advantages of the present invention will be apparent from the following description.

I have found that the objects of the invention may be obtained by first cross-linking the polyethylene by a predetermined amount and thereafter expanding the partially cross-linked product by impregnating the polymer with nitrogen under pressure and expanding the nitrogen impregnated polymer by releasing the pressure.

By using nitrogen in accordance with the present invention it has been found that the rate of diffusion of nitrogen into and out of the individual cells formed within the expanded product is substantially the same as the rate of diffusion of air in the surroundings with the result that the products of the invention have greater dimensional stability than the products hitherto obtained. Although nitrogen is normally soluble in polyethylene only with some difficulty, I have discovered that by effecting the cross-linking reaction prior to impregnation of the polymer with nitrogen, it is possible subsequently to impregnate the polymer with sufficient nitrogen such that on expanding the impregnated polymer a low density foamed product is obtained.

According to the present invention, therefore, there is provided a process for the production of an expanded polyethylene product having a density greater than 1 lb. per cubic ft. and not more than 5 lbs. per cubic ft. which process comprises raising the melting point by submitting said polymer to a cross-linking treatment equivalent to that produced by an irradiation dose of between 2 to 6 megarads or a suitable organic peroxide content of 0.1 to 0.3 part by weight per 100 parts by weight of polymer and thereafter heating the cross-linked polymer to a temperature above the softening temperature in an atmosphere of nitrogen at a pressure of 2,000–12,000 lbs. per sq. inch to impregnate the polymer with nitrogen and expanding the nitrogen impregnated polymer by releasing the pressure. The cross-linking may be effected by an ionizing radiation dose of e.g. 4 megarads, or alternatively the cross-linking may be effected by intimately blending the polymer with e.g. 0.25 part by weight of organic peroxide per 100 parts by weight of polymer and heating the blend to a temperature above the temperature at which the peroxide dissociates into free radicals. The organic peroxide may be dicumyl peroxide.

The polyethylene polymer preferably has a density of 0.90 to 0.94 gm. per cc. prior to the modification treatment.

In the case where the polyethylene to be expanded is modified by ionizing radiation, the shape of the polymeric article may be formed by conventional means prior to the modification process and then modified by ionizing radiation. When free radicals are used as the modifying agent, the free radicals may be obtained by the dissociation with heat of an organic peroxide. The organic peroxide may be blended intimately with the polyethylene using a conventional mixing equipment such as a mill or an extruder and subsequently the polymer is formed to the desired shape and then modified by heating the composition at or above the temperature at which the organic peroxide dissociates into free radicals.

The polymeric article modified in either of the above described ways may then be placed in a suitable pressure vessel into which nitrogen gas is introduced at a pressure within the range 2,000–12,000 lbs. per sq. inch, and the pressure vessel is heated to a temperature higher than that of the softening temperature of the modified polymer until the heated modified polymer contains a sufficient quantity of gas to expand the modified polymeric article to a density of not more than 5 lbs. per cubic ft. This expansion may be accomplished:

(1) By releasing the pressure in one stage or in more than one stage to atmospheric pressure whilst the modified polymer is still at or above the softening temperature; or (2) By cooling the pressure vessel whilst at a gas pressure of not less than 25 lbs. per sq. inch to a temperature at which the modified polyethylene article is rigid and unexpanded or partially expanded and releasing the gas pressure to atmospheric pressure.

The rigid unexpanded or partially expanded modified polymeric article may be fully expanded by heating the article at atmospheric pressure to a temperature at or above the softening temperature of the modified polymer. An alternative procedure may be used to fully expand the article by heating the unexpanded or partially expanded article under a comparatively low gas pressure of 10 to 200 lbs. per sq. inch and suddenly releasing the gas pressure to atmospheric pressure.

As an example of ionizing radiation which may be used for the purpose of this invention, high energy electrons produced by a Van de Graaff Accelerator have been found suitable for the modifying process but gamma rays, X-rays or other ionizing radiation may also be used.

A convenient supply of free radicals may be obtained by the dissociation with heat of an organic peroxide contained within the polymer to be modified. Dicumyl peroxide is a suitable organic peroxide which dissociates on heating to give free radicals.

The polymers which can be modified and processed in the manner described are those polymers which are recognised in the art as being "low density" polyethylene polymers which have a density not less than 0.9 and not more than 0.94 gram per cubic centimetre.

Examples of those polymers which can be modified to give expanded polymers with a density less than 5 lbs. per cubic ft. are those supplied by Imperial Chemical Industries Limited, as Alkathene XDK–10, Alkathene WJG–11, Alkathene XLF–28 and Alkathene WRM–19, but it will be obvious to those familiar with the art that similar polymers can be treated in the same manner.

The advantage gained by means of the modification step is apparent from the following table, which shows the densities obtained with modified and unmodified polymers when expanded by the same method. A typical method is described in the examples hereinafter.

TABLE

| Polymer | Melt flow index | Solid density, gm./cc. | Expanded lb./ft.$^3$, unmodified polymer | Density, modified polymer |
|---|---|---|---|---|
| XDK–10 | Below 0.50. | 0.920–0.929 | 10 | 2.5 |
| WJG–11 | 1.0–3.0 | 0.919 and below | 33 | 2.2 |
| WRM–19 | 16–25 | do | 30 | 2.4 |
| XLF–28 | 3.1–6.0 | 0.920–0.929 | 20 | 2.5 |

It has been found that the degree of polymer modification exercises control over the quality of density of the expanded product. The quality of the expanded product is assessed by the degree of distortion of the article during the gas absorption cycle and whether the expanded product contains holes, splits or fractures. When the degree of polymer modification is less than that obtained by the minimum levels indicated above, the polymeric article distorts during the gas absorption cycle and on expansion frequently shows signs of splits and holes. When the degree of polymer modification is higher than that obtained by the maximum levels indicated above the expansion of the article is restricted and is normally accompanied by the presence of fractures within the article.

It has also been found that the degree of expansion of the polymeric article is influenced by the pressure of the gas and the temperature during the gas absorption cycle. For the purposes of this invention it is preferred that the gas pressure lies between 2,000 and 12,000 lbs. per square inch and the temperature during the gas absorption cycle is at least 10° F. higher than the softening temperature of the modified ethylene polymer used in the process.

It will be apparent that the purposes of this invention are not restricted to the use of pure aliphatic ethylene polymers. Colours, antioxidants, fillers and similar compounding ingredients may be added to the raw polymer which is to be modified to enhance the character, to improve the properties or to cheapen the cost of the expanded product. It will be apparent also that the expanded polymeric article can be modified still further if desired by the action of ionizing radiation to confer additional heat stability and solvent resistance properties.

The following examples illustrate the nature of the invention:

EXAMPLE 1

A 3" length of extruded tubular section of Alkathene WJG-11 with an internal diameter of 0.2" and an external diameter of 0.7" was irradiated with high energy electrons from a Van de Graaff Accelerator until the energy absorbed was 4 Megarad. The section was placed in a pressure vessel into which nitrogen gas was introduced to a pressure of 4,500 lbs. per square inch. The temperature was raised to 320° F. for a period of 3 hours after which the pressure was released to 500 lbs. per square inch for a further 45 minutes and finally released to atmospheric pressure. The expanded tubular section had a fine cellular structure with a length of 6.9" and internal and external diameters of 0.6" and 2.0", respectively, and a density of 3 lbs. per cubic foot.

EXAMPLE 2

250 grams of Alkathene XLF-28 in the form of chips was blended on a mill, the bowls of which were kept at 250° F. 0.6 gram of dicumyl peroxide were intimately blended with the Alkathene XLF-28 on the mill and the polymer was sheeted off. The sheet was cut into small pieces which were loaded into a 6" x 6" x 1/8" compression mould and moulded at 260° F. for 10 minutes followed by a heating period of 15 minutes at 320° F. The cooled sheet was placed in a pressure vessel into which nitrogen gas was introduced at a pressure of 5,500 lbs. per square inch. The temperature was raised to 310° F. for a period of 4 hours after which the pressure vessel was cooled to room temperature. The solid sheet was placed in an air oven at a temperature of 212° F. which was gradually increased to 270° F. The expanded sheet had a density of 3 lbs. per cubic foot.

EXAMPLE 3

300 grams of Alkathene WJG-11 chips, irradated with high energy electrons until the energy absorbed was 2 megarads was intimately blended with 30 grams of carbon black on a mill at 320-330° F. A moulded 3/8" sheet was prepared from the composition and expanded in the manner described in Example 1. The expanded piece had a density of 2.6 lbs. per cubic foot.

EXAMPLE 4

300 grams of Alkathene WJG-11 with 0.75 gram of dicumyl peroxide and 6 grams of Irgalite Yellow Br. was mixed, and a sheet was moulded and expanded in the manner described in Example 2. The expanded sheet had an attractive yellow color and had a density of 3.5 lbs. per cubic foot.

EXAMPLE 5

500 grams of WJG-11 was blended on a mill kept at a temperature of 250° F. with 100 grams of a crystalline calcium carbonate and 1.25 grams of dicumyl peroxide. A formed sheet was heated for 15 minutes at 320° F. and subsequently expanded in the manner described in Example 2. The expanded sample had a density of 3.2 lbs. per cubic foot.

EXAMPLE 6

A 2" x 4¾" x 3/8" slab of Alkathene WJG-11 irradiated with high energy electrons until the energy absorbed was 4 megarad was placed in a pressure vessel into which nitrogen gas was introduced to a pressure of 5,000 lbs. per square inch. The temperature was raised to 280° F. for a period of 3 hours after which the pressure was released to 500 lbs. per square inch for a further 30 minutes, and then released to 100 lbs. per square inch. The pressure vessel was cooled and the pressure reduced to atmospheric pressure. The partly expanded slab was reheated to 280° F. at 75 lbs. per square inch for 1 hour and the pressure was released to give an expanded, fine cellular slab with a density of 2.9 lbs. per cubic foot.

EXAMPLE 7

An irradiated slab similar to that quoted in Example 6 was gassed at 10,000 lbs. per square inch for 4 hours at 209° F. after which the pressure was suddenly released to 7,500 lbs. per square inch and then reduced over a period of 30 minutes to atmospheric pressure. The fine cellular expanded slab had a density of 1.6 lbs. per cubic foot.

EXAMPLE 8

Two similar pieces of 5" x ¾" x 3/8" solid polyethylene were cut from the same slab of material which had been prepared by extruding a sheet using W.J.G. 11 granules and subsequently irradiated with high energy electrons until the energy absorbed was 6 megarads.

One piece was placed in a pressure vessel previously heated to a temperature of 272° F. and nitrogen gas was introduced to a pressure of 4,800 p.s.i. The temperature and pressure were maintained for 3 hours after which the pressure was rapidly dropped to 500 lbs. per sq. in. The new pressure was maintained for 15 minutes and then the gas pressure was dropped to atmospheric pressure. The fully expanded rectangular sample had a density of 2.9 lb./cu. ft. and a fine cell size of 0.3-0.7 mm. This sample was identified as A.10 nitrogen.

The second piece was later placed in the same vessel previously heated to a temperature of 300° F. together with 5.1 litres of 1,2 dichlorotetrafluoro ethane. Under the temperature conditions of the vessel, the halocarbon produced on autogeneous pressure of 450 lb. per sq. in. which was reached in 1 hour. The temperature and pressure were maintained for a further period of 3 hours after which the pressure was released to atmospheric pressure. The fully expanded rectangular section had a density of 2.1 lb./cu. ft. and a coarse cell size of 3.0-6.0 mm. This sample was identified as A.10 halocarbon.

A study of dimensional change with time was made by inserting pins through the expanded samples of A.10 nitrogen and A.10 halocarbon at either ends of the length. The protruding points of the pins were used as reference points to give an arbitrary length of approximately 12 inches, and the samples were placed in a thermostatically controlled room operating at 20° C. Length dimensions between the pins were recorded at various intervals of time. The change in dimension was expressed as a percentage of the length dimension 2½ hours after the sample was removed from the pressure vessel and the results were plotted against time graphically in FIG. 1. An examination of the graph shows the superior dimensional stability of the A.10 nitrogen sample.

We claim:

1. A process for the production of an expanded polyethylene product having a density greater than 1 lb. per cubic foot but not more than 5 lbs. per cubc foot which process comprises raising the melting point of ethylene polymer by submitting the said polymer to a cross-linking treatment equivalent to that produced by an irradiation dose of between 2 and 6 megarads and thereafter heating the cross-linked polymer to a temperature above the softening temperature in atmosphere of nitrogen at a pressure of 2,000 to 12,000 lbs. per square inch to impregnate the polymer with nitrogen and expanding nitrogen impregnated polymer by releasing the pressure.

2. A process as claimed in claim 1, wherein the cross-linking is affected with an organic peroxide.

3. A process as claimed in claim 1 wherein the polyethylene polymer has a density not less than 0.90 and not more than 0.94 gm. per cc.

4. A process as claimed in claim 1, wherein the cross-linking is effected by an ionizing radiation dose of 4 megarads.

5. A process as claimed in claim 1 wherein the cross-linking is effected by intimately blending the polymer with 0.25 part by weight of organic peroxide per 100 parts by weight of polymer and heating the blend to a temperature above the temperature at which the peroxide dissociates into free radicals.

6. A process as claimed in claim 2 wherein the organic peroxide is dicumyl peroxide.

7. A process as claimed in claim 1 wherein the nitrogen impregnated polymer is expanded by cooling while the polymer is under a pressure of not less than 25 lbs. per square inch to a temperature at which the polymer is rigid and thereafter completing the expansion by heating the nitrogen impregnated polymer at atmospheric pressure to the softening point.

8. A process as clamed in claim 1 wherein the expansion of the nitrogen impregnated polymer is carried out by heating the impregnated polymer at a pressure within the range 10 to 200 lbs. per square inch until the softening point is reached and then suddenly releasing the pressure at atmospheric pressure.

9. A process as claimed in claim 1 wherein the expansion of the nitrogen impregnated polymer is carried out by heating the impregnated and partially expanded polymer at a pressure of 10 to 200 lbs. per square inch until the softening point is reached and suddenly releasing the pressure to atmospheric pressure.

10. A process as claimed in claim 1 wherein the polymer is moulded to the required shape prior to cross-linking.

References Cited

UNITED STATES PATENTS

| | | | |
|---|---|---|---|
| 2,948,664 | 8/1960 | Rubens et al. | 260—2.5 E |
| 3,098,832 | 7/1963 | Pooley et al. | 260—2.5 E |
| 3,251,728 | 5/1966 | Humbert et al. | 260—2.5 E |

MURRAY TILLMAN, Primary Examiner

W. J. BRIGGS, Sr., Assistant Examiner

U.S. Cl. X.R.

204—159.2; 260—94.9 GA